(12) United States Patent
Harding et al.

(10) Patent No.: US 7,524,436 B2
(45) Date of Patent: Apr. 28, 2009

(54) LIQUID CRYSTAL POLYMER FILM WITH IMPROVED STABILITY

(75) Inventors: Robert Harding, Hants (GB); Matthew Francis, Walton (GB); Louise Diane Farrand, Dorset (GB); Kevin Adlem, Bournemouth (GB)

(73) Assignee: Merck Patent GmbH, Darmstadt (DE)

( * ) Notice: Subject to any disclaimer, the term of this patent is extended or adjusted under 35 U.S.C. 154(b) by 122 days.

(21) Appl. No.: 11/635,767

(22) Filed: Dec. 8, 2006

(65) Prior Publication Data

US 2007/0134444 A1 Jun. 14, 2007

(30) Foreign Application Priority Data

Dec. 10, 2005 (EP) .................................. 05027036

(51) Int. Cl.
*C09K 19/00* (2006.01)
*C09K 19/06* (2006.01)
*C09K 19/12* (2006.01)
*C09K 19/20* (2006.01)
*C09K 19/30* (2006.01)

(52) U.S. Cl. ............................ 252/299.01; 252/299.61; 252/299.62; 252/299.63; 252/299.64; 252/299.65; 252/299.66; 252/299.67; 252/299.1; 430/20; 428/1.1; 428/1.2

(58) Field of Classification Search .................. 430/20; 428/1.1, 1.2, 4.1; 252/299.01, 299.61–299.67, 252/299.1

See application file for complete search history.

(56) References Cited

U.S. PATENT DOCUMENTS

| 5,344,956 | A | 9/1994 | Allewaert et al. |
|---|---|---|---|
| 5,995,184 | A | 11/1999 | Chung et al. |
| 6,599,443 | B1 | 7/2003 | Sharples et al. |
| 6,689,900 | B2 | 2/2004 | Wang et al. |
| 6,924,861 | B2 * | 8/2005 | Hammond-Smith et al. 349/129 |
| 7,029,728 | B2 * | 4/2006 | Dunn et al. .................. 428/1.1 |
| 7,060,200 | B1 | 6/2006 | Farrand et al. |
| 7,344,762 | B2 * | 3/2008 | Hammond-Smith et al. . 428/1.1 |
| 2002/0017633 | A1 | 2/2002 | Goulding et al. |
| 2002/0111518 | A1 | 8/2002 | Wang et al. |
| 2004/0202799 | A1 | 10/2004 | Bauer et al. |

FOREIGN PATENT DOCUMENTS

| EP | 1 256 617 A1 | 11/2002 |
|---|---|---|
| EP | 1256617 A1 | 11/2002 |
| GB | 2 383 040 B1 | 6/2003 |
| GB | 2 398 077 | 8/2004 |
| GB | 2398077 A | 8/2004 |
| WO | WO 99/45082 | 9/1999 |
| WO | WO 99/45082 A | 9/1999 |
| WO | WO 2005/076074 | 8/2005 |

* cited by examiner

*Primary Examiner*—Geraldina Visconti
(74) *Attorney, Agent, or Firm*—Millen, White, Zelano, Branigan, P.C.

(57) ABSTRACT

The invention reports on the use of multi-reactive polymerizable surfactants in mixtures of polymerizable mesogenic materials. The polymerizable surfactants are readily polymerized into the liquid crystal film and build a protective topcoat layer. The invention also relates to a method of producing polymeric optical films with improved stability by using the surfactants. Uses of these films are given for various applications including security applications and displays.

14 Claims, 1 Drawing Sheet

LIQUID CRYSTAL POLYMER FILM WITH IMPROVED STABILITY

FIELD OF THE INVENTION

The present invention reports on the use of multi-reactive polymerizable surfactants in mixtures of polymerizable mesogenic materials. The polymerizable surfactants are readily polymerized into the liquid crystal film and build a protective topcoat layer. The invention also relates to a method of producing polymeric optical films with improved stability by using the surfactants. Uses of these films are given for various applications including security applications and displays.

BACKGROUND AND PRIOR ART

Polymerizable liquid crystal materials are known in prior art for the preparation of anisotropic polymer films with uniform orientation. These films are usually prepared by coating a thin layer of a polymerizable liquid crystal mixture onto a substrate, aligning the mixture into uniform orientation and polymerizing the mixture. The orientation of the film can be planar, i.e. where the liquid crystal molecules are oriented substantially parallel to the layer, homeotropic (rectangular to the layer) or tilted.

For specific applications it is required to induce planar alignment in the liquid crystal layer. The alignment is then frozen in by polymerizing the liquid crystal mixture in situ. For example, oriented films or layers of polymerized nematic liquid crystal material with planar alignment are useful as A-plate compensators or polarizers. Another important application is oriented films or layers of polymerized cholesteric liquid crystal material having twisted molecular structure. If the cholesteric material has planar alignment, these films show selective reflection of light where the reflection color is dependent on the viewing angle. They can be used for example as circular polarizers, color filters or for the preparation of effect pigments for decorative or security applications.

Planar alignment can be achieved for example by treatment of the substrate onto which the liquid crystal material is coated, such as rubbing or application of alignment layers, or by applying shear forces to the liquid crystal material, for example during or after coating.

It is also known in prior art that planar alignment of a liquid crystal material on a single substrate, with one surface of the liquid crystal material being open to the air, can be achieved or enhanced by addition of a surface active compound to the liquid crystal material.

In contrast homeotropic alignment in layers of liquid crystal material is not enhanced by surface active agents. Thus, these agents are generally not employed in LC mixtures for homeotropic aligned layers. Adding a surface active agent for planar alignment into a homeotropic layer can be even detrimental to the uniform alignment.

Molecules with a low surface energy readily accumulate at the LC/air interface promoting the planar orientation effect as reported for example in U.S. Pat. No. 5,344,956. In practice, once polymerized the LC films may be part of a composite LC cell, in which other layers need to be added to the polymer LC film, such as, but not restricted to, other liquid crystal, adhesive or barrier layers.

In prior art the use of Fluorad FC171® (a non-reactive, fluorocarbon surfactant from 3M, St. Paul, Minn.) and the fluorocarbon acrylates FX13® (a monoacrylate from 3M), Zonyl® 8857A (DuPont) and PolyFox® PF-3320 (Omnova Solutions Inc.) have been disclosed in EP 1256617 A1 and US 2004/0202799 A1.

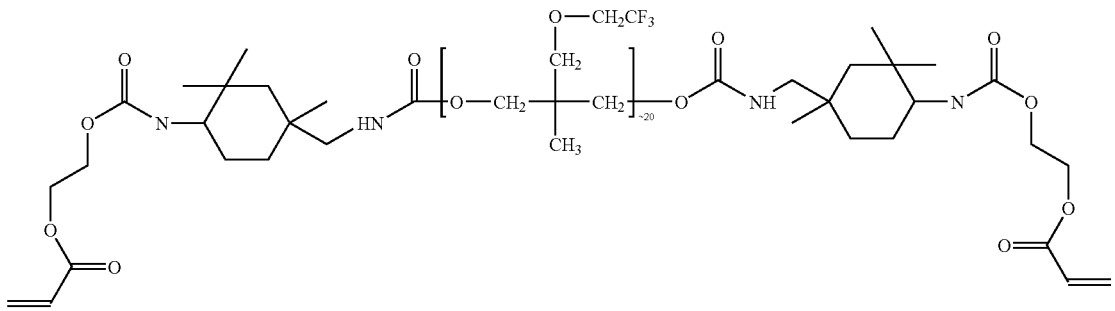

Scheme 1.
Polyfox® PF-3320, a direactive fluorosurfactant.

In EP1256617 A1 a reactive surfactant has been used as an additive to modify the reactive mesogen (RM) mixture. This concept has also, more recently, been reported in US 2004/0202799. In all cases, the reactive surfactant was chosen so that it would react with the RMs in the mixture and hence be locked in place. As such, the surfactant is not free to migrate from the RM layer. This is desired when manufacturing stacks of films (as highlighted in EP 1256617). Due to the low surface tension of surfactant materials any non-polymerized surfactants may readily migrate into a subsequent layer. This can be prevented by the use of a mono-reactive surfactant, e.g. FX13®.

For example, WO 99/45082 describes an optical retardation film that is obtained from a layer of polymerizable liquid crystal material with planar alignment comprising one or more fluorocarbon surfactants. U.S. Pat. No. 5,995,184 reports a method of making a phase retardation plate from a layer of polymerizable liquid crystal material with planar alignment, where a surface active material, like for example a polyacrylate, polysilicone or organosilane, is added to the liquid crystal material to reduce the tilt angle at the liquid crystal/air interface of the liquid crystal layer.

US 2002/0111518 A1 discloses fluorinated multifunctional acrylates for the use in coating compositions. There is no reference made to RM films. A synthesis of the compounds is disclosed.

Problem

Low diacrylate content RM films are often used where good adhesion of the RM film to the substrate is important. However, the optical retardation of low diacrylate content RM films drops significantly under accelerated conditions, typically at an elevated temperature of 90° C. in a dry atmosphere. This effect is much worse when the film is tested in contact with PSA (pressure sensitive adhesive), rather than just the open film itself. One aim of the present invention is therefore to improve the stability of low-diacrylate films.

Examination of FIG. 1 reveals that most of the drop in retardation of the film occurs at the beginning of the experiment. It is possible that some additives in the PSA are leaching into the RM film and either disturbing the alignment near to the surface of the film or even swelling the bulk film. One common method to prevent any migration of additives into the RM material (RMM) film is to coat the polymerized RMM layer with a hard coat (sometimes called a topcoat). Such layers usually contain small molecules which are cured after coating to build a rigid polymer network. Unfortunately, the use of a hard coat layer requires extra processing steps (e.g. GB 2398077), which are costly and therefore undesirable.

It was therefore an aim of the present invention to provide a polymerizable liquid crystal material for the preparation of polymer films that does not have the drawbacks described above. Other aims of the present invention are immediately evident to the person skilled in the art from the following detailed description.

Definition of Terms

Polymerizable compounds with one polymerizable group are also referred to as "monoreactive" compounds, compounds with two polymerizable groups as "direactive" compounds, and compounds with more than two polymerizable groups as "multireactive" compounds. Compounds without a polymerizable group are also referred to as "non-reactive" compounds.

The term "reactive mesogen" (RM) means a polymerizable mesogenic or liquid crystal compound. Materials comprising more or less of reactive mesogens (RMs) are also addressed herein as RM material (RMM).

The term 'film' as used in this application includes self-supporting, i.e. free-standing, films that show more or less pronounced mechanical stability and flexibility, as well as coatings or layers on a supporting substrate or between two substrates.

The term 'liquid crystal or mesogenic material' or 'liquid crystal or mesogenic compound' should denote materials or compounds comprising to a certain percentage one or more rod-shaped, board-shaped or disk-shaped mesogenic groups, i.e. groups with the ability to induce liquid crystal phase behavior. Liquid crystal compounds with rod-shaped or board-shaped groups are also known in the art as 'calamitic' liquid crystals. Liquid crystal compounds with a disk-shaped group are also known in the art as 'discotic' liquid crystals. The compounds or materials comprising mesogenic groups do not necessarily have to exhibit a liquid crystal phase themselves. It is also possible that they show liquid crystal phase behavior only in mixtures with other compounds, or when the mesogenic compounds or materials, or the mixtures thereof, are polymerized.

For the sake of simplicity, the term 'liquid crystal material' or 'LC material' is used hereinafter for both liquid crystal materials and mesogenic materials, and the term 'mesogen' is used for the mesogenic groups of the material.

The director means the preferred orientation direction of the long molecular axes (in case of calamitic compounds) or short molecular axis (in case of discotic compounds) of the mesogens in a liquid crystal material.

The term 'planar structure' or 'planar orientation' refers to a layer or film of liquid crystal material wherein the director is substantially parallel to the plane of the film or layer.

The term "homeotropic structure" or "homeotropic orientation" refers to a film wherein the optical axis is substantially perpendicular to the film plane.

The term "cholesteric structure" or "helically twisted structure" refers to a film comprising LC molecules wherein the director is parallel to the film plane and is helically twisted around an axis perpendicular to the film plane.

For sake of simplicity, an optical film with twisted, planar or homeotropic orientation or structure is hereinafter also referred to as "twisted film", "planar film" or "homeotropic film" respectively.

The term 'A plate' refers to an optical retarder utilizing a layer of uniaxially birefringent material with its extraordinary axis oriented parallel to the plane of the layer.

The term 'C plate' refers to an optical retarder utilizing a layer of uniaxially birefringent material with its extraordinary axis perpendicular to the plane of the layer.

The terms 'hard coat' or 'topcoat' refer to an additional layer providing extra physical or chemical properties to another layer underneath. The hard coat or topcoat can be an integral part of the layer underneath in terms of the manufacturing process. According to the invention the hard coat or topcoat and the underlying layer are preferably made from a single composition. Accordingly there may be only a gradual change in the properties of the formed stack of layers. In this case there may be no sharp line between the hard coat and the layer underneath. This is not detrimental to the bulk characteristics of the underneath layer nor to the surface characteristics of the hard coat.

SUMMARY OF THE INVENTION

Figure 1:
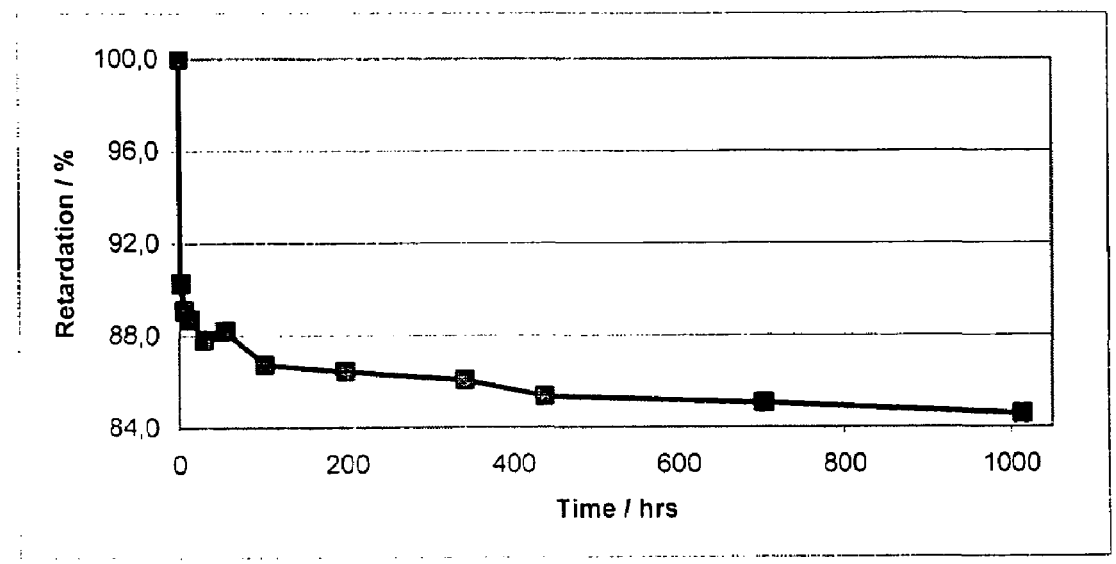
FIG. 1 shows the thermal durability of a LC film in contact with PSA measured by its ability to preserve the optical retardation against time (1000 h). The film was prepared with an ordinary non-polymerizable fluorosurfactant. The material used is described in Comparative Example 4. The film stack prepared from a LC polymer film laminated with PSA to a glass substrate was heated at 90° C. for 1,000 hours. The graph shows a significant loss in retardation of the film over time (1000 hours).

The invention relates to a polymerizable liquid crystal material comprising at least one polymerizable surface-active compound (surfactant), characterized in that the surface active compound comprises two or more polymerizable groups. The invention relates to new surface active compounds with four or more polymerizable groups.

The invention further relates to anisotropic films and a method of producing an anisotropic polymer film with a topcoat layer, by applying a polymerizable liquid crystal material according to the invention. The polymerizable surfactant may be used as a surface hardening agent for these films.

According to the invention, materials composed and polymer films produced are used for optical devices or decorative or security use, in polarisers, compensators, beam splitters, alignment layers, reflective films, color filters, holographic elements, hot stamping foils, colored images, decorative or security markings.

DETAILED DESCRIPTION OF THE INVENTION

The inventors of the present invention have found that manufacturing of liquid crystal films with improved durability can be achieved by providing a polymerizable liquid crystal mixture that comprises one or more polymerizable surface-active compounds with multiple polymerizable groups. The present invention reports on the use of such multi-reactive polymerizable surfactants in mixtures of polymerizable mesogenic materials. The polymerizable surfactants are readily polymerized into and onto the liquid crystal film. They build a hard topcoat or they otherwise improve the robustness of the non-mechanical properties or the LC film, like e.g. its chemical stability and the preservation of optical properties over time and under chemical or thermal stress. The present invention further demonstrates how it is possible to use low-diacrylate liquid crystal polymers together with adjacent layers coated onto these film without affecting the optical properties of the liquid crystal polymer films.

From the understanding of mixture formulation and effect of the surfactant's chemical structure surfactants have been found which can be used in both planar and homeotropic RMMs. In the case of planar oriented mixtures the surfactant helps align the RMM. It is noteworthy, that in the case of homeotropic mixtures the surfactant does not influence the RMM alignment. These surfactants are different to those previously reported in such use in that they are multi-reactive, i.e. contain multiple reactive (e.g. acrylate) groups. Preferably they contain more than two reactive groups, such as 3, 4, 5 or 6 groups, more preferably 4 groups. In one embodiment of the invention, such surfactants are used as additives in RMMs to achieve improved thermal stability of polymerized RMM films in contact with PSA. Preferably the multi-reactive surfactant is a fluorosurfactant.

Bifunctional or higher polyfunctional polymerizable acrylate monomers usable herein are preferably polymerizable fluorosurfactants with more than two polymerizable groups comprising a polyfluorinated straight chain having 6-12 atoms in length to which one, two or three polymerizable groups are linked at each end by a branched spacer having 5 to 30 C—, O— or N-atoms. Preferably it contains a perfluorinated alkylene chain with 6 to 12, preferably 8 to 10, C-atoms. The fluorosurfactant has three to six, preferably 4 or more polymerizable groups. The polymerizable surface-active compounds preferably comprise polymerizable groups selected from acryl, methacryl, epoxy, vinyl, vinyloxy, styrene and propenyl ether groups. Preferably, polyfunctional surfactants include compounds of the formula wherein
$Z^3$, $Z^4$ independently are —(CO)O, —O(CO)—, —O(CO)O, —NH(CO)O, —O(CO)NH—, —O— or a single bond
n is 3 to 12,
m, o, p and q are independently, 0, 1, or 2.

The current invention uses polymerizable LC material in combination with a polymerizable surfactant having multiple reactive groups. In this current invention the desire is not only to prevent surfactant migration but to also create a hard layer on top of the polymer film (sometimes called a top coat layer or a hard coat). To summarize, in this invention the reactive surfactant offers extra functionality. As well as acting as an optional alignment additive (if desired) the multi-reactive surfactant also produces a hard coat layer at the surface of the RMM (particularly the air interface), without the need to coat a separate layer. The hard coat layer is created in-situ with the formation of the underlying polymer film. In this way, a significant saving in film manufacturer processing can be achieved because the need to coat a separate hard coat layer is avoided. The resulting bilayered film has an improved surface hardness and thermal durability. In practice the surface of the film is relatively more cross-linked than the core film. Its surface is highly cross-linked and thus, it is less prone to swelling or impurities entering by diffusion. Less migrated impurities and a high degree of polymerization add to the thermal stability of the film, especially the stability of its optical properties. Thus, the polymerizable surfactant may act as a surface hardening agent in polymer films, especially of optical polymer films, preferably of liquid crystalline films.

At the same time the film may have a low content of cross-linking agents, like mesogenic or conventional diacrylates etc., in order to show excellent adhesion to the substrate after polymerization. The amount of diacrylate is preferably less than 20%, most preferably less than 10%.

The film is well polymerized at the surface, even in contact with air. The method of producing the polymer films according to the invention is well adapted to be carried out in ambient atmosphere. There is no particular need for it to be carried out in an inert atmosphere like e.g. nitrogen gas.

The invention also relates to a method of producing anisotropic films, including multilayered films consisting of a film with topcoat layers on one or both sides, with improved properties or less production steps. The method can be used for all kinds of alignment, namely for planar and homeotropic films. Remarkably, the structure of homeotropic layers is preserved uniformly.

Further, the invention relates to the use films and polymerizable materials according to the invention for optical devices or decorative or security use, in polarisers, compensators, beam splitters, alignment layers, reflective films, color filters, holographic elements, hot stamping foils, colored images,

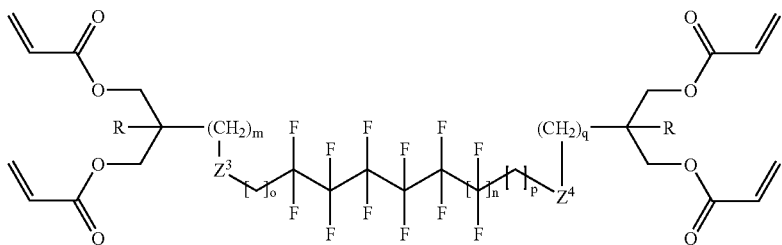

decorative or security markings, and for the preparation of liquid crystal pigments for decorative or security applications.

The polymerizable LC material according to invention comprises preferably 0.01 to 10% by weight of polymerizable surface-active compounds with two or more polymerizable groups. In a preferred embodiment the polymerizable surface-active compounds comprise at least four polymerizable groups. More preferably the polymerizable surface-active compound is selected from compounds of the following formula:

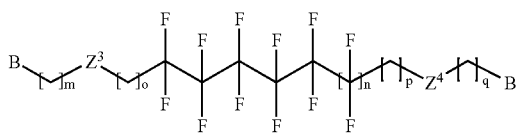

wherein
$Z^3$, $Z^4$ is —(CO)O, —O(CO)—, —O(CO)O, —NH(CO)O, —O(CO)NH—, —O— or a single bond
n is 3 to 12,
m, o, p and q are independently, 0, 1, or 2
B is a group of —CP$_3$, —CRP$_2$, —NP$_2$ or

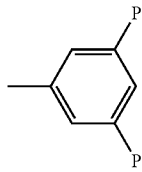

P is a polymerizable group P$^0$ attached by a spacer Sp,
P$^0$ is, in case of multiple occurrence independently of one another, a polymerizable group, preferably an acryl, methacryl, oxetane, epoxy, vinyl, vinyloxy, propenyl ether or styrene group,
Sp is a 1-12 C straight or branched alkylen, it being also possible for one or more non-adjacent CH$_2$ groups to be replaced, in each case independently from one another, by —O—, —NH—, —N(CH$_3$)—, —CO—, —(CO)O—, —O(CO)— or —C≡C— in such a manner that hetero atoms (O, N) are not linked directly to one another, and
R is H, CN, NO$_2$, halogen or a straight-chain or branched alkyl radical with up to 25 C atoms which may be unsubstituted, mono- or polysubstituted by halogen or CN, it being also possible for one or more non-adjacent CH$_2$ groups to be replaced, in each case independently from one another, by —O—, —S—, —NH—, —N(CH$_3$)—, —CO—, —(CO)O—, —O(CO)—, —O(CO)—O—, —S(CO)—, —(CO)S— or —C≡C— in such a manner that oxygen atoms are not linked directly to one another.

The drop in retardation of an ordinary RMM film (produced from a mixture with the non-polymerizable fluorosurfactant FC171 according to Comparative Example 4) stuck to glass using PSA is shown in FIG. 1. Retardation of the LC polymer films is used here as in indicator of film quality. The film stacks were heated at 90° C. for 1,000 hours and retardation measurements were taken at periodic intervals throughout this time. A considerable decrease in retardation is observed for an ordinary film without any surfactants according to the invention.

Typically the degree of cure of air curable systems, such as those detailed in this invention, is generally lower at the air surface due to oxygen inhibition of the photo-initiator radicals. This phenomenon is of significant disadvantage when a hard surface of a polymer layer is desired. To overcome this the use of reactive surfactants in conjunction with certain photo-initiators to create an in-situ hard coat layer in the RMM film is of advantage. In a preferred embodiment of the present invention the polymerizable LC material contains at least 3% of a initiator for polymerization, especially a photo-initiator. Especially preferred is a content of initiator of at least 5% and not more than 10% by weight. These amounts are given for use in ambient atmosphere containing oxygen. When polymerization is carried in absence of oxygen, it is possible to substantially reduce the amount of initiators, usually by a factor of 6. The additional effort to work with inert gases is usually not desirable.

Many initiators are commercially available and known to a person skilled in the art. For polymerizable acrylates aromatic ketones with N—, O— or P— heteroatom substitution in alpha-Position to the ketone group are the mostly used, which are also referred to as acetophenone derivatives (Ullmann's Encyclopedia of Industrial Chemistry, 7$^{th}$ Edition, Wiley-VCH, 2005).

Surprisingly it was found that some of these initiators are especially well suited for use in polymerizable mixtures according to the invention. Thus, in a preferred embodiment of the present invention alpha-hydroxy ketone derivates are used as initiators for polymerizing. The alpha-hydroxy ketone derivates are aromatic ketones, especially of formula P1:

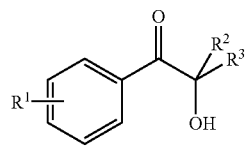

P1 wherein
$R^1$ is alkyl, F, Cl, NO$_2$, OH, etc. or a group —CH$_2$-1,4-phenyl-(CO)—C(OH)R$^1$R$^2$,
$R^2$, $R^3$ are 1-5 C alkyl or together form a 5-6 C cycloalkyl ring.

Examples of alpha-hydroxy ketones are known and commercially available, including (1-hydroxycyclohexyl)phenylmethanone (Irgacure® 184) and 2-hydroxy-2-methyl-1-phenyl-1-propan-1-one (Darocur® 1173).

Especially preferred as a photoinitiator is 2-hydroxy-1-{4-[4-(2-hydroxy-2-methyl-propionyl)-benzyl]-phenyl}-2-ethyl-propan-1-one, an initiator with two alpha-hydroxy ketone groups. These initiators are also referred to as alpha-hydroxy benzophenone derivatives. The derivatives include alpha-hydroxy acetophenones which may be further substituted at the phenyl ring or substituted at the alpha-carbon atom.

The preferred aromatic alpha-hydroxy ketone initiators are used alone or in combination with other initiators. Preferably they are used together with one ore more other photo-initiators. The amount of the aromatic alpha-hydroxy ketone is preferably at least 0.5% by weight, more preferably at least 3%, but preferably not more than 10%, more preferably not more than 6%.

In another preferred embodiment of the present invention a thermal initiator is used for polymerizing. Thermal initiators are preferably used in addition to a common photoinitiator.

Examples of a combination are peroxides as thermal initiators (e.g. lauroyl peroxide, benzoyl peroxide) and the well known acetophenone derivatives as photoinitators. The use thermal initiators adds to the degree of polymerization, especially at the air interface of the films and makes them even more stable against degradation. Preferarably 0.5 to 10% by weight, more preferably 1 to 5% by weight of one or more thermal initiators are used.

More preferably a combination of one ore more photoinitiators and of one or more thermal initiators are used as polymerization initiators for the LC material.

The polymerizable LC material is preferably a mixture of two or more compounds, at least one of which is a polymerizable or cross-linkable compound. Polymerizable compounds with one polymerizable group are hereinafter also referred to here as "monoreactive". Cross-linkable compounds, i.e. having two or more polymerizable groups, are also referred to here as "di- or multireactive".

The polymerizable LC material preferably comprises at least one monoreactive compound and at least one di- or multireactive compound.

The polymerizable mesogenic or LC compounds are preferably monomers, very preferably calamitic monomers. These materials typically have good optical properties, like reduced chromaticity, and can be easily and quickly aligned into the desired orientation, which is especially important for the industrial production of polymer films at large scale. It is also possible that the polymerizable material comprises one or more discotic monomers.

The compositions comprising polymerizable materials as described above and below are another aspect of the invention.

Unless stated otherwise, the percentages of components of a polymerizable mixture, as given above and below, refer to the total amount of solids in the mixture, i.e. not including solvents.

The compositions usually comprise 40 to 98% of monoreactive and 0 to 40% of di- or multireactive mesogens. In absence of other polymerizable compounds, the composition preferably comprises 50% or more to 96% or less, most preferably 60% or more to 93% or less of monoreactive mesogens. Further, the composition preferably comprises 0% or more to 30% or less, more preferably 0% or more to 20% or less, most preferably 0% or more to 10% or less, of di- or multireactive mesogens. In some so-called 'low-acrylate' films the content of diacrylate mesogens can be lowered to 6% or less. In these cases one advantage of the invention is the stabilization of these relatively soft films.

The composition preferably comprises 60% or more to 93% or less of monoreactive mesogens together with 4% or more to 20% or less of di- or multireactive mesogens. A small amount (more than 4%, preferably less than 20%) of directive mesogens is beneficial to prevent the formation of smectic phases in nematic mixtures. The amount of direactive mesogen can be lower otherwise. On the other hand, in the presence of ordinary direactive monomers, less or no di- or multireactive mesogens are needed for this purpose.

Polymerizable mesogenic mono-, di- and multireactive compounds suitable for the present invention can be prepared by methods which are known per se and which are described in standard works of organic chemistry like for example Houben-Weyl, Methoden der organischen Chemie, Thieme-Verlag, Stuttgart.

Suitable polymerizable mesogenic or LC compounds for use as monomer or comonomer in a polymerizable LC mixture are disclosed for example in WO 93/22397, EP 0 261 712, DE 195 04 224, WO 95/22586, WO 97/00600, U.S. Pat. Nos. 5,518,652, 5,750,051, 5,770,107 and 6,514,578.

The polymerizable mesogenic compounds of the liquid crystal material are preferably selected of formula I

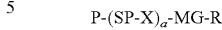   I wherein
P is a polymerizable group,
Sp is a spacer group having 1 to 25 C atoms,
X is —O—, —S—, —CO—, —COO—, —OCO—, —CO—NH—, —NH—CO—, —CH$_2$CH$_2$—, —OCH$_2$—, —CH$_2$O—, —SCH$_2$—, —CH$_2$S—, —CH=CH—, —CH=CH—COO—, —OCO—CH=CH—, —C≡C—, or a single bond,
a is 0 or 1,
MG is a mesogenic group, and
R is H, CN, NO$_2$, halogen or a straight-chain or branched alkyl radical with up to 25 C atoms which may be unsubstituted, mono- or polysubstituted by halogen or CN, it being also possible for one or more non-adjacent CH$_2$ groups to be replaced, in each case independently from one another, by —O—, —S—, —NH—, —N(CH$_3$)—, —CO—, —COO—, —OCO—, —OCO—O—, —S—CO—, —CO—S— or —C≡C— in such a manner that oxygen atoms are not linked directly to one another, or alternatively R denotes P-(Sp-X)$_n$—.

MG in formula I is preferably selected of formula II

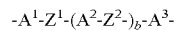   II wherein
Z$^1$ and Z$^2$ are each independently —COO—, —OCO—, —CH$_2$CH$_2$—, —OCH$_2$—, —CH$_2$O—, —CH=CH—, —CH=CH—COO—, —OCO—CH=CH—, —C≡C—, or a single bond,
A$^1$, A$^2$ and A$^3$ are each independently 1,4-phenylene in which, in addition, one or more CH groups may be replaced by N, 1,4-cyclohexylene in which, in addition, one or two non-adjacent CH$_2$ groups may be replaced by O and/or S, 1,4-cyclohexenylene, 1,4-bicyclo(2,2,2)octylene, piperidine-1,4-diyl, naphthalene-2,6-diyl, decahydronaphthalene-2,6-diyl, or 1,2,3,4-tetrahydro-naphthalene-2,6-diyl, it being possible for all these groups to be unsubstituted, mono- or polysubstituted with F, Cl, OH, CN, NO$_2$ or alkyl, alkoxy or alkanoyl groups having 1 to 7 C atoms wherein one or more H atoms may be substituted by F or Cl, and
b is 0, 1 or 2.

A smaller group of preferred mesogenic groups of formula II is listed below. For reasons of simplicity, Phe in these groups is 1,4-phenylene, PheL is a 1,4-phenylene group which is substituted by 1 to 4 groups L, with L being F, Cl, CN, OH, NO$_2$ or an optionally fluorinated or chlorinated alkyl, alkoxy or alkanoyl group with 1 to 7 C atoms, and Cyc is 1,4-cyclohexylene. The following list of preferred mesogenic groups is comprising the subformulae II-1 to II-25 as well as their mirror images

| | |
|---|---|
| -Phe-Z-Phe- | II-1 |
| -Phe-Z-Cyc- | II-2 |
| -Cyc-Z-Cyc- | II-3 |
| -PheL-Z-Phe- | II-4 |
| -PheL-Z-Cyc- | II-5 |
| -PheL-Z-PheL- | II-6 |
| -Phe-Z-Phe-Z-Phe- | II-7 |
| -Phe-Z-Phe-Z-Cyc- | II-8 |
| -Phe-Z-Cyc-Z-Phe- | II-9 |

| | |
|---|---|
| -Cyc-Z-Phe-Z-Cyc- | II-10 |
| -Phe-Z-Cyc-Z-Cyc- | II-11 |
| -Cyc-Z-Cyc-Z-Cyc- | II-12 |
| -Phe-Z-Phe-Z-PheL- | II-13 |
| -Phe-Z-PheL-Z-Phe- | II-14 |
| -PheL-Z-Phe-Z-Phe- | II-15 |
| -PheL-Z-Phe-Z-PheL- | II-16 |
| -PheL-Z-PheL-Z-Phe- | II-17 |
| -PheL-Z-PheL-Z-PheL- | II-18 |
| -Phe-Z-PheL-Z-Cyc- | II-19 |
| -Phe-Z-Cyc-Z-PheL- | II-20 |
| -Cyc-Z-Phe-Z-PheL- | II-21 |
| -PheL-Z-Cyc-Z-PheL- | II-22 |
| -PheL-Z-PheL-Z-Cyc- | II-23 |
| -PheL-Z-Cyc-Z-Cyc- | II-24 |
| -Cyc-Z-PheL-Z-Cyc- | II-25 |

Particularly preferred are the subformulae II-1, II-2, II-4, II-6, II-7, II-8, II-11, II-13, II-14, II-15 and II-16.

In these preferred groups Z in each case independently has one of the meanings of $Z^1$ as given in formula II above. Preferably Z is —(CO)O—, —O(CO)—, —CH$_2$CH$_2$—, —C≡C— or a single bond.

Examples of suitable and preferred polymerizable mesogenic or LC compounds (reactive mesogens) are shown in the following list.

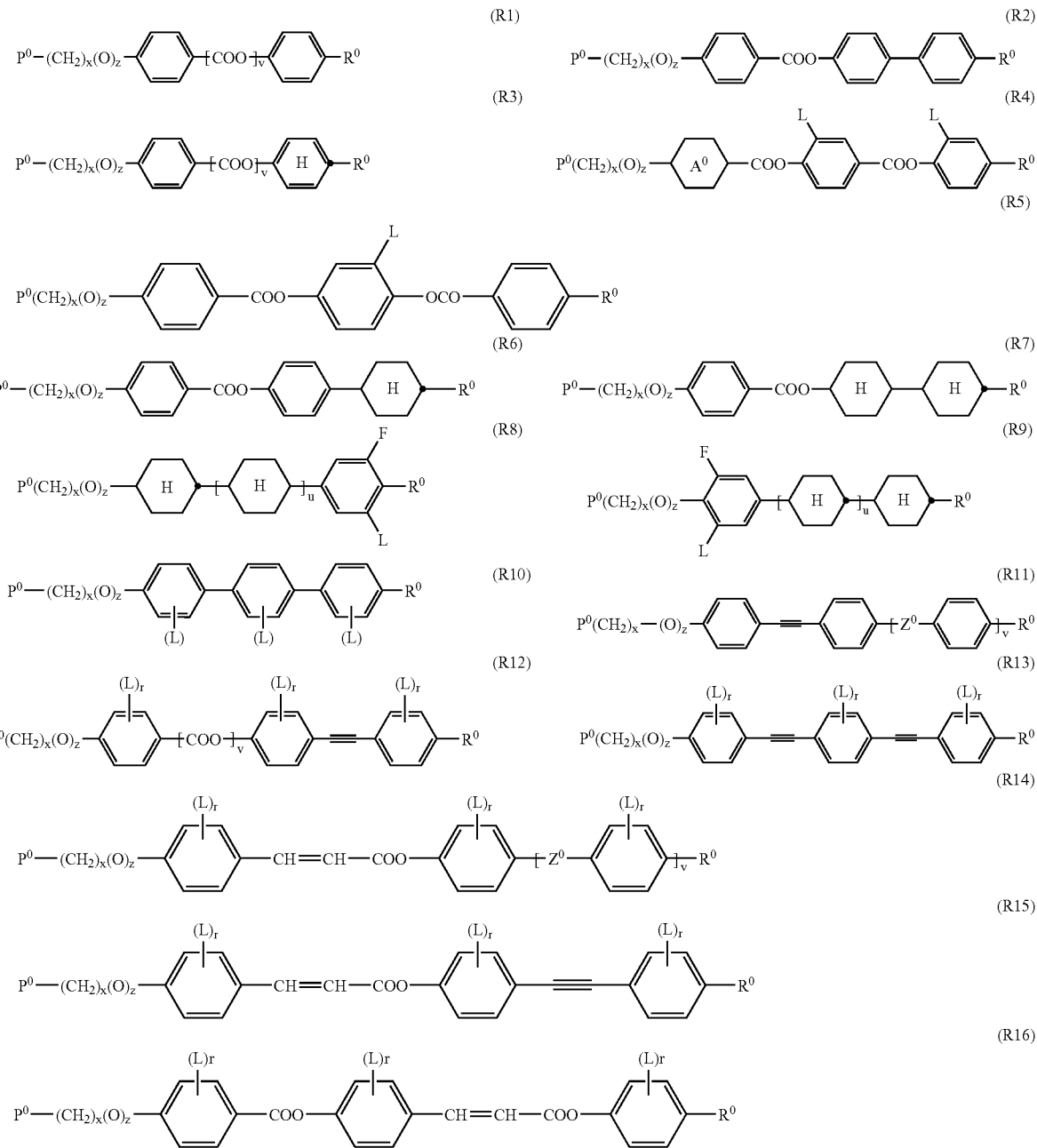

-continued
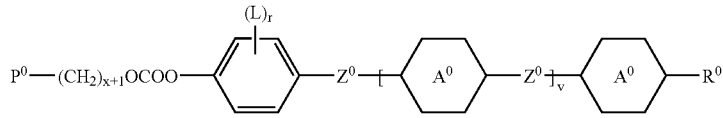
(R17)
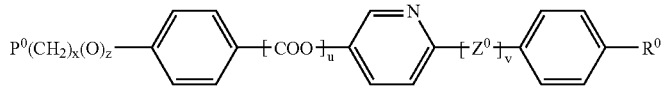
(R18)
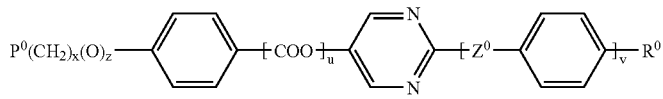
(R19)
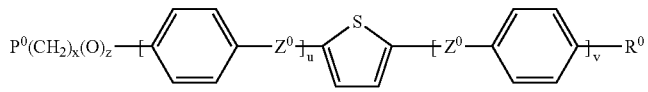
(R20)
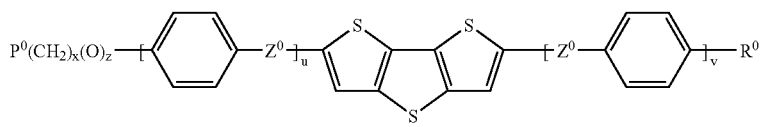
(R21)
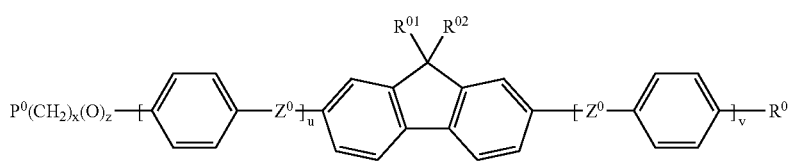
(R22)
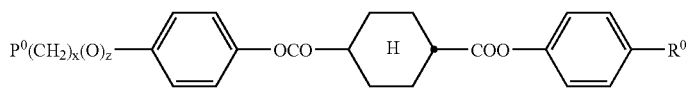
(R23)
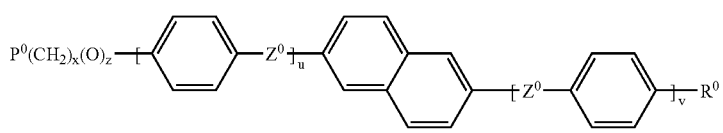
(R24)
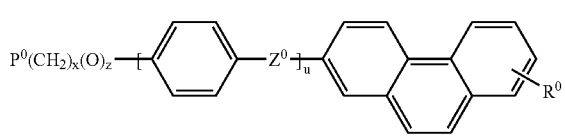
(R25)
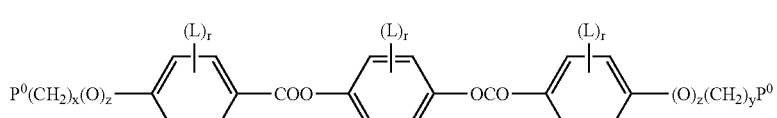
(R26)
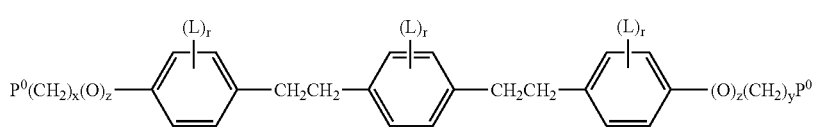
(R27)
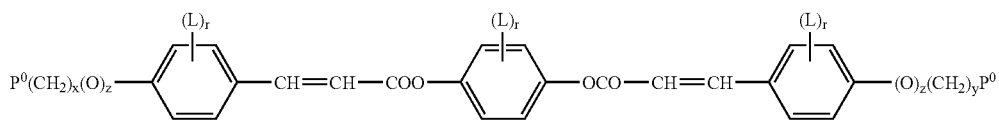
(R28)

-continued
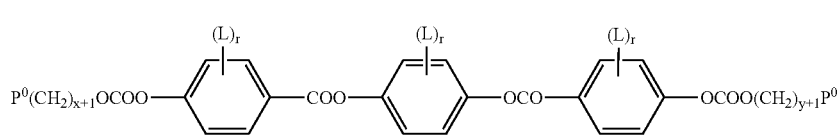
(R29)
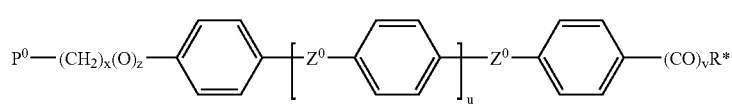
(R30)
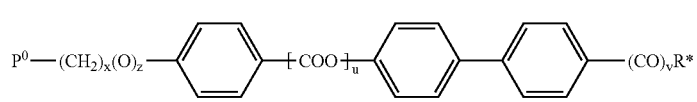
(R31)
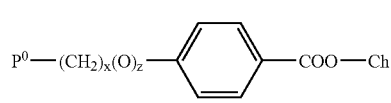
(R32)
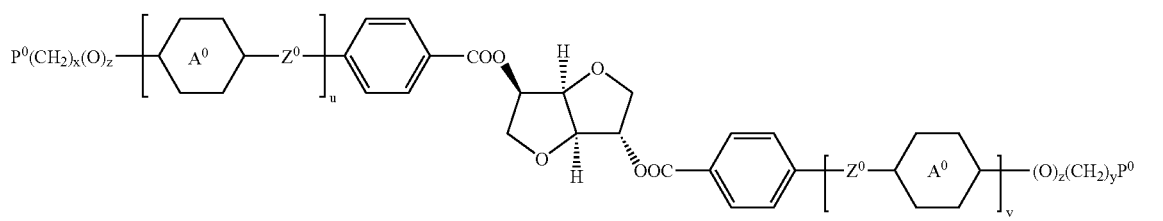
(R33)
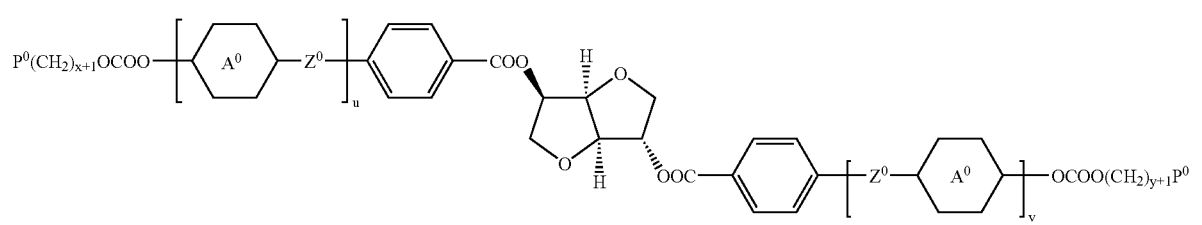
(R34)
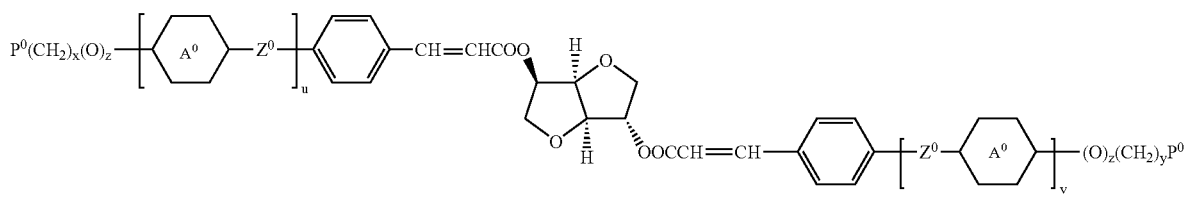
(R35)
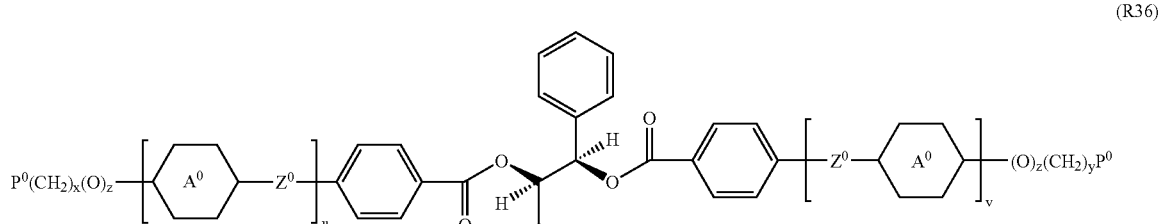
(R36)

-continued

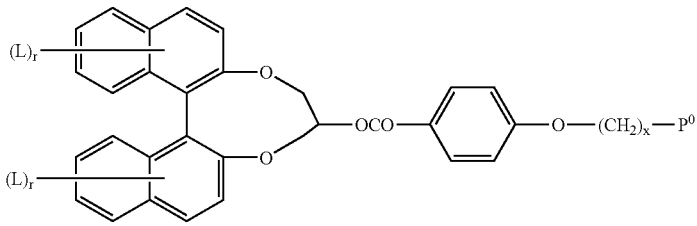

(R37)

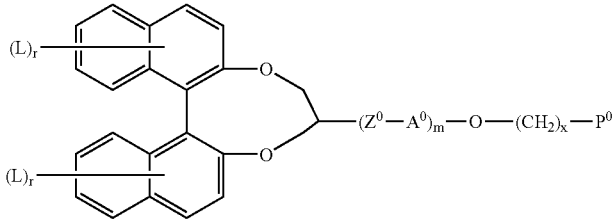

(R38)

wherein

P⁰ is, in case of multiple occurrence independently of one another, a polymerizable group, preferably an acryl, methacryl, oxetane, epoxy, vinyl, vinyloxy, propenyl ether or styrene group, r is 0, 1, 2, 3 or 4, x and y are independently of each other 0 or identical or different integers from 1 to 12, z is 0 or 1, with z being 0 if the adjacent x or y is 0, A⁰ is, in case of multiple occurrence independently of one another, 1,4-phenylene that is optionally substituted with 1, 2, 3 or 4 groups L, or trans-1,4-cyclohexylene, u and v are independently of each other 0 or 1, Z⁰ is, in case of multiple occurrence independently of one another, —(CO)O—, —O(CO)—, —CH$_2$CH$_2$—, —C≡C—, —CH═CH—, —CH═CH—(CO)O—, —O(CO)—CH═CH— or a single bond, R⁰ is alkyl, alkoxy, thioalkyl, alkylcarbonyl, alkoxycarbonyl, alkylcarbonyloxy or alkoxycarbonyloxy with 1 or more, preferably 1 to 15 C atoms which is optionally fluorinated, or is Y⁰ or P⁰—(CH$_2$)$_y$—(O)$_z$—, Y⁰ is F, Cl, CN, NO$_2$, OCH$_3$, OCN, SCN, SF$_5$, optionally fluorinated alkylcarbonyl, alkoxycarbonyl, alkylcarbonyloxy or alkoxycarbonyloxy with 1 to 4 C atoms, or mono- oligo- or polyfluorinated alkyl or alkoxy with 1 to 4 C atoms, R$^{01,02}$ are independently of each other H, R⁰ or Y⁰, R* is a chiral alkyl or alkoxy group with 4 or more, preferably 4 to 12 C atoms, like 2-methylbutyl, 2-methyloctyl, 2-methylbutoxy or 2-methyloctoxy, Ch is a chiral group selected from cholesteryl, estradiol, or terpenoid radicals like menthyl or citronellyl, L is, in case of multiple occurrence independently of one another, H, F, Cl, CN or optionally halogenated alkyl, alkoxy, alkylcarbonyl, alkoxycarbonyl, alkylcarbonyloxy or alkoxycarbonyloxy with 1 to 5 C atoms, and wherein the benzene rings can additionally be substituted with one or more identical or different groups L.

Suitable unpolymerizable chiral compounds are for example standard chiral dopants like R- or S-811, R- or S-1011, R- or S-2011, R- or S-3011, R- or S-4011, R- or S-5011, or CB 15 (all available from Merck KGaA, Darmstadt, Germany).

Suitable polymerizable chiral compounds are for example (R33) to (R38) listed above, or the polymerizable chiral material Paliocolor® LC756 (from BASF AG, Ludwigshafen, Germany).

Very preferred are chiral compounds with a high helical twisting power (HTP), in particular compounds comprising a sorbitol group as described for example in WO 98/00428, compounds comprising a hydrobenzoin group as described for example in GB 2,328,207, chiral binaphthyl derivatives as described for example in WO 02/94805, chiral binaphthol acetal derivatives as described for example in WO 02/34739, chiral TADDOL derivatives as described for example in WO 02/06265, and chiral compounds having at least one fluorinated linkage group and a terminal or central chiral group as described for example in WO 02/06196 or WO 02/06195.

Film Preparation

Unless stated otherwise, the general preparation of polymer LC films according to this invention can be carried out according to standard methods known from the literature. Typically a polymerizable LC material is coated or otherwise applied onto a substrate where it aligns into uniform orientation, and polymerized in situ in its LC phase at a selected temperature for example by exposure to heat or actinic radiation, preferably by photo-polymerization, very preferably by UV-photopolymerization, to fix the alignment of the LC molecules. If necessary, uniform alignment can promoted by additional means like shearing or annealing the LC material, surface treatment of the substrate, or adding surfactants to the LC material. The polymerizable material can be applied onto the substrate by conventional coating techniques like spin-coating, bar or blade coating.

It is also possible to dissolve the polymerizable material in a suitable solvent. This solution is then coated or printed onto the substrate, for example by spin-coating or other known techniques, and the solvent is evaporated off before polymerization. In many cases it is suitable to heat the mixture in order to facilitate the evaporation of the solvent. As solvents for example standard organic solvents can be used. The solvents can be selected for example from ketones such as acetone, methyl ethyl ketone, methyl propyl ketone or cyclohexanone; esters such as methyl, ethyl or butyl acetate or methyl acetoacetate; alcohols, such as methanol, ethanol or isopropyl alcohol; aromatic solvents such as toluene or xylene; halogenated hydrocarbons such as di- or trichloromethane; glycols or their esters such as PGMEA (propyl glycol monomethyl ether acetate), γ-butyrolactone, and the like. It is also possible to use binary, ternary or higher mixtures of the above solvents.

Initial alignment (e.g. planar alignment) of the polymerizable LC material can be achieved for example by rubbing treatment of the substrate, by shearing the material during or after coating, by annealing the material before polymerization, by application of an alignment layer, by applying a magnetic or electric field to the coated material, or by the addition of surface-active compounds to the material. Reviews of alignment techniques are given for example by I. Sage in "Thermotropic Liquid Crystals", edited by G. W. Gray, John Wiley & Sons, 1987, pages 75-77; and by T. Uchida and H. Seki in "Liquid Crystals—Applications and Uses Vol. 3", edited by B. Bahadur, World Scientific Publishing, Singapore 1992, pages 1-63. A review of alignment materials and techniques is given by J. Cognard, Mol. Cryst. Liq. Cryst. 78, Supplement 1 (1981), pages 1-77.

It is also possible to apply an alignment layer onto the substrate and provide the polymerizable material onto this alignment layer. Suitable alignment layers are known in the art, like for example rubbed polyimide or alignment layers prepared by photoalignment as described in U.S. Pat. Nos. 5,602,661, 5,389,698 or 6,717,644.

It is also possible to induce or improve alignment by annealing the polymerizable LC material at elevated temperature, preferably at its polymerization temperature, prior to polymerization.

Polymerization is achieved for example by exposing the polymerizable material to heat or actinic radiation. Actinic radiation means irradiation with light, like UV light, IR light or visible light, irradiation with X-rays or gamma rays or irradiation with high energy particles, such as ions or electrons. Preferably polymerization is carried out by UV irradiation. As a source for actinic radiation for example a single UV lamp or a set of UV lamps can be used. When using a high lamp power the curing time can be reduced.

Polymerization is preferably carried out in the presence of an initiator absorbing at the wavelength of the actinic radiation. For example, when polymerizing by means of UV light, a photoinitiator can be used that decomposes under UV irradiation to produce free radicals or ions that start the polymerization reaction. For polymerizing acrylate or methacrylate groups preferably a radical photoinitiator is used. For polymerizing vinyl, epoxide or oxetane groups preferably a cationic photoinitiator is used. It is also possible to use a thermal polymerization initiator that decomposes when heated to produce free radicals or ions that start the polymerization. Typical radicalic photoinitiators are for example the commercially available Irgacure® or Darocure® (Ciba Geigy AG, Basel, Switzerland). A typical cationic photoinitiator is for example UVI 6974 (Union Carbide).

The polymerizable material may also comprise one or more stabilizers or inhibitors to prevent undesired spontaneous polymerization, like for example the commercially available Irganox® (Ciba Speciality Chemicals, Basel, Switzerland).

The curing time depends, inter alia, on the reactivity of the polymerizable material, the thickness of the coated layer, the type of polymerization initiator and the power of the UV lamp. The curing time is preferably $\leqq 5$ minutes, very preferably $\leqq 3$ minutes, most preferably $\leqq 1$ minute. For mass production short curing times of $\leqq 30$ seconds are preferred.

The polymerizable material may also comprise one or more dyes having an absorption maximum adjusted to the wavelength of the radiation used for polymerization, in particular UV dyes like e.g. 4,4"-azoxy anisole or Tinuvin® dyes (from Ciba Speciality Chemicals).

In another preferred embodiment the polymerizable material comprises one or more monoreactive polymerizable non-mesogenic compounds, preferably in an amount of 0 to 50%, very preferably 0 to 20%. Typical examples are alkylacrylates or alkylmethacrylates.

In another preferred embodiment the polymerizable material comprises one or more di- or multireactive polymerizable non-mesogenic compounds (excluding polymerizable surfactants, which are considered separately), preferably in an amount of 0 to 80%, very preferably 0 to 50%, most preferably 5 to 20%, alternatively or in addition to the di- or multireactive polymerizable mesogenic compounds. Typical examples of direactive non-mesogenic compounds are alkyldiacrylates or alkyldimethacrylates with alkyl groups of 1 to 20 C atoms. Typical examples of multireactive non-mesogenic compounds are trimethylpropanetrimethacrylate or pentaerythritoltetraacrylate. With compounds of this class less of the di- or multireactive polymerizable mesogens is needed and more of the monoreactive mesogens is added to the compositions. All ranges given in the further context of the application are adapted to where no non-mesogenic polymerizable compound is added, excluding small amounts of polymerizable surfactants according to the invention.

It is also possible to add one or more chain transfer agents to the polymerizable material in order to modify the physical properties of the polymer film. Especially preferred are thiol compounds, for example monofunctional thiols like dodecane thiol or multifunctional thiols like trimethylpropane tri (3-mercaptopropionate). Very preferred are mesogenic or LC thiols as disclosed for example in WO 96/12209, WO 96/25470 or U.S. Pat. No. 6,420,001. By using chain transfer agents the length of the free polymer chains and/or the length of the polymer chains between two crosslinks in the polymer film can be controlled. When the amount of the chain transfer agent is increased, the polymer chain length in the polymer film decreases.

The polymerizable material can additionally comprise one or more additional components like for example catalysts, sensitizers, stabilizers, inhibitors, chain-transfer agents, co-reacting monomers, surface-active compounds, lubricating agents, wetting agents, dispersing agents, hydrophobing agents, adhesive agents, flow improvers, defoaming agents, deaerators, diluents, reactive diluents, auxiliaries, colorants, nano-particles and -tubes, dyes or pigments, expecially wetting agents, rheology modiefiers and surfactants, mostly depending on the item to be marked.

The thickness of a polymer film according to the present invention is preferably from 0.3 to 5 microns, very preferably from 0.5 to 3 microns, most preferably from 0.7 to 2.0 microns. For use as an alignment layer, thin films with a thickness of 0.05 to 1, preferably 0.1 to 0.4 microns are preferred.

The on-axis retardation (i.e. at 0° viewing angle) of a polymer film according to the present invention is preferably from 0 to 400 nm, especially preferably from 100 nm to 250 nm for planar oriented films and 0 to 5 nm for homeotropic oriented films.

It is also possible to add, for example, a quantity of up to 20% by weight of a non polymerizable liquid-crystalline compound to adapt the optical properties of the resulting polymer film.

The polymer film of the present invention can also be used as an alignment layer for LC materials. For example, it can be used in an LC display to induce or improve alignment of the switchable LC medium, or to align a subsequent layer of polymerizable LC material coated thereon. In this way, stacks of polymerized LC films can be prepared.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees, Celsius and, all parts and percentages are by weight, unless otherwise indicated.

The following compounds defined below are used in the examples:

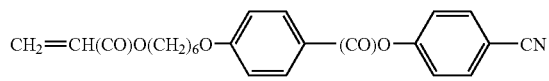

(A)

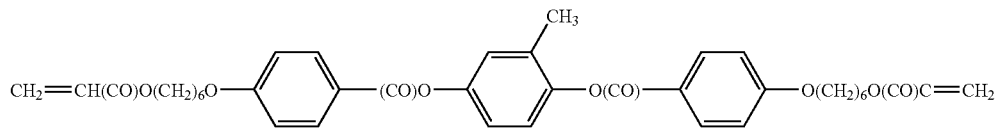

(B)

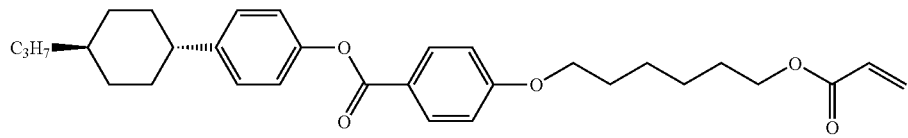

(C)

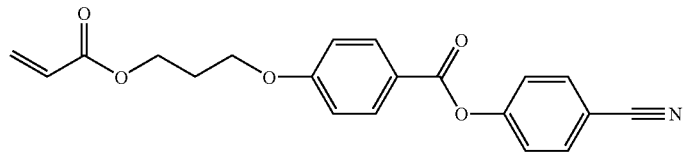

(D)

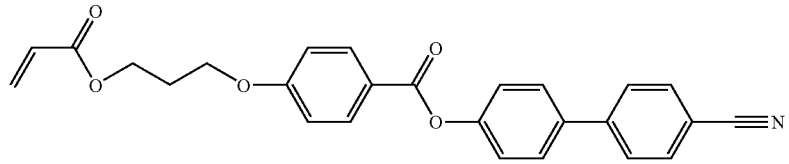

(E)

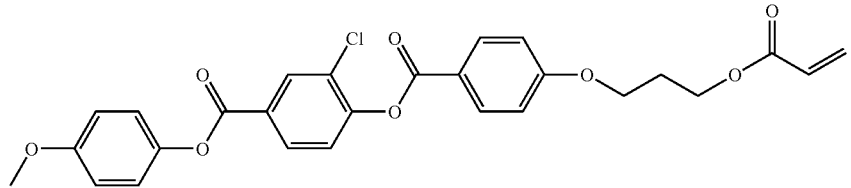

(F)

The polymerizable mesogenic compounds (A), (B) and (C) can be prepared according to or in analogy to the methods described in D. J. Broer et al., Makromol. Chem. 190, 3201-3215 (1989). The following are alpha-hydroxybenzophenone photoinitiators:

Irgacure® 127 is 2-Hydroxy-1-{4-[4-(2-hydroxy-2-methyl-propionyl)-benzyl]-phenyl}-2-methyl-propan-1-one, a commercially available alpha-hydroxyketone type UV curing catalyst used to initiate the radical photopolymerization of vinylic and acrylic-based coating formulations (Ciba® Specialty Chemicals) of the following formula:

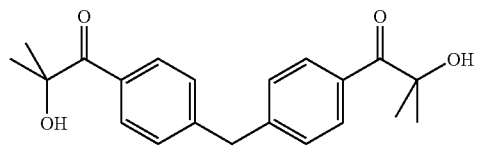

Irgacure® 184 is 1-Hydroxy-cyclohexyl-phenyl-ketone, a commercially available free-radical photoinitiator (Ciba® Specialty Chemicals) of the following formula:

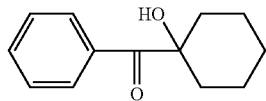

Irgacure® 2959 is 1-[4-(2-Hydroxyethoxy)-phenyl]-2-hydroxy-2-methyl-1-propane-1-one, a commercially available radical photoinitiator for UV curing (Ciba® Specialty Chemicals) of the following formula:

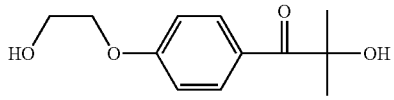

Darocur® 1173 is 2-hydroxy-2-methyl-1-phenyl-propan-1-one, a commercially available liquid photoinitiator (Ciba® Specialty Chemicals) of the following formula:

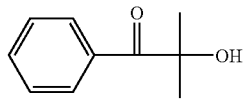

Further photoinitiators and other additives are the following:

Irgacure® 651 is 2,2-Dimethoxy-1,2-diphenylethan-1-one, a commercially available solid, free-radical photoinitiator (Ciba® Specialty Chemicals) of the following formula:

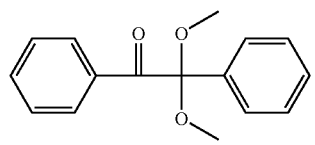

Irgacure® 754 is oxo-phenyl-acetic acid 1-methyl-2-[2-(2-oxo-2-phenyl-acetoxy)-propoxy]-ethyl ester, a commercially available liquid photoinitiator (Ciba® Specialty Chemicals).

Irgacure® 907 is 2-methyl-1-[4-(methylthio)phenyl]-2-(4-morpholinyl)-1-propanone, a commercially available photoinitiator (Ciba® Specialty Chemicals).

Irganox® 1076 is (Octadecyl3,5)-di-tert-butyl-4-hydroxy-hydrocinnamate, a commercially available stabilizing agent (Ciba® Specialty Chemicals).

Surfactants:

Surfactant Fluorad FC171® commercially available from 3M, St. Paul, Minn., USA

Experimental

Films are bar-coated from a 30% solid solution of the defined mixtures in toluene on to rubbed TAC substrates using a wire wound bar (4 μm film thickness while wet), annealed at 60° C. for 30 s, and subsequently polymerized with UV light. Curing of the films is accomplished at 500 mW/cm² UV-A radiation with a belt speed of 10 m/min or thermally, unless stated otherwise. The effective irradiation time is approx 1-2 s. Durability measurements are made for these films (designated as TAC/RMM film) stuck to glass using a pressure sensitive adhesive (PSA). To ensure good adhesion of the TAC/RMM/PSA/glass stack each complete stack is pressed together using a laminating machine. To test the thermal stability of the RMM film the stacks are placed in a dry oven at 90° C. Retardation stability results, after given times, are shown below for various different mixture compositions. The retardations observed at 500 and 1000 h regularly have similar values (+1% for the last 500 h), which is in line with the flat retardation curve at 500 h drying time and above (FIG. 1).

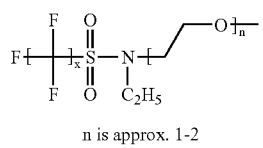

n is approx. 1-2

Surfactant FX13

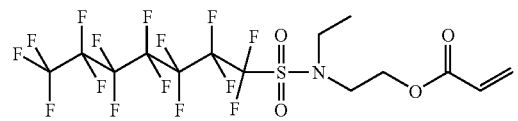

Surfactant 1

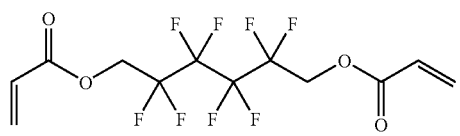

Surfactant 2

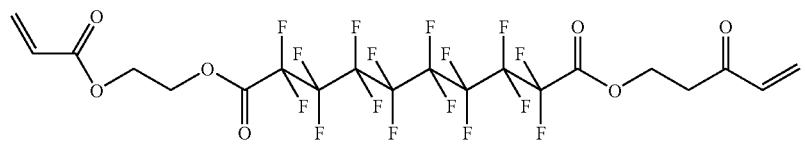

Surfactant 3

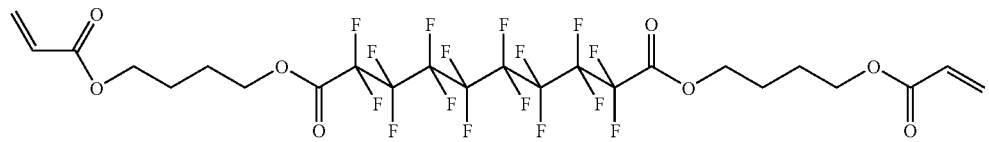

Surfactant 4

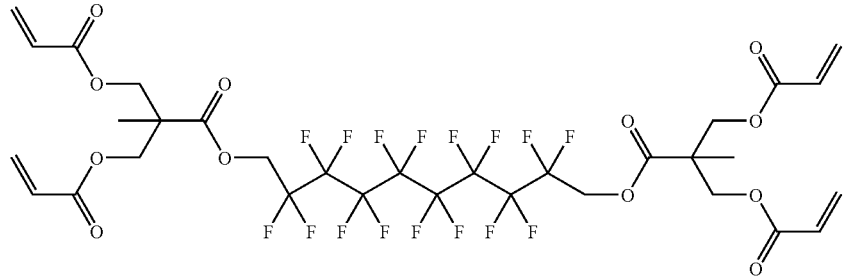

EXAMPLE 1

The following polymerizable liquid crystal mixture is prepared and used for film formation:

| | |
|---|---|
| Compound (A) | 40.00% |
| Compound (B) | 5.92% |
| Compound (D) | 20.00% |
| Compound (F) | 27.00% |
| Irganox ® 1076 | 0.08% |
| Irgacure ® 907 | 5.00% |
| Irgacure ® 2959 | 1.00% |
| Surfactant 4 | 1.00% |

The degree of polymerization (number-average) is determined as 83% by analysis of the FT-IR peak of the acrylic absorption bands.

A retardation drop of 10% after 500 h and 11% after 1000 h is observed.

EXAMPLE 2

The following polymerizable liquid crystal mixture is prepared and used for film formation:

| | |
|---|---|
| Compound (A) | 40.00% |
| Compound (B) | 5.92% |
| Compound (D) | 20.00% |
| Compound (F) | 27.00% |
| Irganox ® 1076 | 0.08% |
| Irgacure ® 907 | 5.00% |
| lauroyl peroxide | 1.00% |
| Surfactant 4 | 1.00% |

The film is cured by UV as described above.

The degree of polymerization (number-average) is determined as 81% by analysis of the FT-IR peak of the acrylic absorption bands.

A retardation drop of 15% (1000 h) is observed.

EXAMPLE 3

A cured film freshly prepared as in Example 2 is further cured thermally for 1 min at 150° C. The degree of polymerization (number-average) is determined as 95%.

A retardation drop of 10% (1000 h) is observed.

EXAMPLE 4

The following polymerizable liquid crystal mixture is prepared and used for film formation:

| | |
|---|---|
| Compound (A) | 40.00% |
| Compound (B) | 5.92% |
| Compound (D) | 20.00% |
| Compound (F) | 27.00% |
| Irganox ® 1076 | 0.08% |
| Irgacure ® 907 | 3.00% |
| Irgacure ® 127 | 3.00% |
| Surfactant 4 | 1.00% |

A retardation drop of 3% (500 h) is observed.

EXAMPLE 5

The following polymerizable liquid crystal mixture is prepared and used for film formation:

| | |
|---|---|
| Compound (A) | 40.23% |
| Compound (B) | 5.95% |
| Compound (D) | 20.10% |
| Compound (F) | 27.64% |
| Irganox ® 1076 | 0.08% |
| Irgacure ® 907 | 5.03% |
| Surfactant 2 | 1.00% |

The film is cured by a static cure at 90 mW/cm² for 5 s. A retardation drop of 21% (500 h) is observed.

EXAMPLE 6

The following polymerizable liquid crystal mixture is prepared and used for film formation:

| | |
|---|---|
| Compound (A) | 40.23% |
| Compound (B) | 5.95% |
| Compound (D) | 20.10% |
| Compound (F) | 27.64% |
| Irganox ® 1076 | 0.08% |
| Irgacure ® 907 | 5.03% |
| Surfactant 3 | 1.00% |

The film is cured by a static cure at 90 mW/cm² for 5 s. A retardation drop of 21% (500 h) is observed.

EXAMPLE 7

The following polymerizable liquid crystal mixture is prepared and used for film formation:

| | |
|---|---|
| Compound (A) | 40.00% |
| Compound (B) | 5.92% |
| Compound (D) | 20.00% |
| Compound (F) | 27.00% |
| Irganox ® 1076 | 0.08% |
| Irgacure ® 907 | 5.00% |
| Darocure ® 1173 | 1.00% |
| Surfactant 4 | 1.00% |

A retardation drop of 18% (1000 h) is observed.

COMPARATIVE EXAMPLE 1

The following polymerizable liquid crystal mixture is prepared and used for film formation:

| | |
|---|---|
| Compound (A) | 40.00% |
| Compound (B) | 5.92% |
| Compound (D) | 20.00% |
| Compound (F) | 27.50% |
| Irganox ® 1076 | 0.08% |
| Irgacure ® 907 | 5.00% |
| Irgacure ® 2959 | 1.00% |
| No surfactant | |

A retardation drop of 20% (500 h) is observed.

COMPARATIVE EXAMPLE 2

The following polymerizable liquid crystal mixture is prepared and used for film formation:

| | |
|---|---|
| Compound (A) | 40.30% |
| Compound (B) | 6.04% |
| Compound (D) | 20.19% |
| Compound (F) | 27.74% |
| Irganox ® 1076 | 0.10% |
| Irgacure ® 907 | 5.07% |
| Irgacure ® 127 | 3.00% |
| Surfactant FX13 | 0.55% |

A retardation drop of 25% (1000 h) is observed.

COMPARATIVE EXAMPLE 3

The following polymerizable liquid crystal mixture is prepared and used for film formation:

| | |
|---|---|
| Compound (A) | 40.00% |
| Compound (B) | 5.92% |
| Compound (D) | 20.00% |
| Compound (C) | 27.50% |
| Irganox ® 1076 | 0.08% |
| Irgacure ® 907 | 3.00% |
| Irgacure ® 127 | 3.00% |
| Surfactant FC171 | 0.50% |

A retardation drop of 10% (500 h) is observed.

COMPARATIVE EXAMPLE 4

The following polymerizable liquid crystal mixture is prepared and used for film formation:

| | |
|---|---|
| Compound (A) | 40.41% |
| Compound (B) | 5.98% |
| Compound (D) | 20.20% |
| Compound (F) | 27.78% |
| Irganox ® 1076 | 0.08% |
| Irgacure ® 907 | 5.05% |
| Surfactant FC171 | 0.50% |

The film is cured by a static cure at 90 mW/cm$^2$ for 5 s.
A retardation drop of 24% (500 h) is observed.

The entire disclosure of all applications, patents and publications, cited herein and of corresponding European application No. 05027036.2, filed Dec. 10, 2005 is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, and make various changes and modifications of the invention to adapt it to various usages and conditions.

The invention claimed is:

1. A polymerizable liquid crystal material comprising at least one polymerizable surface-active compound and at least one reactive mesogen, said surface active compound having four or more polymerizable groups.

2. The polymerizable liquid crystal material according to claim 1, wherein the reactive mesogen is of formula I $$P\text{-}(SP\text{-}X)_a\text{-}MG\text{-}R \qquad I$$

wherein

P is a polymerizable group,

Sp is a spacer group having 1 to 25 C atoms,

X is —O—, —S—, —CO—, —COO—, —OCO—, —CO—NH—, —NH—CO—, —CH$_2$CH$_2$—, —OCH$_2$—, —CH$_2$O—, —SCH$_2$—, —CH$_2$S—, —CH=CH—, —CH=CH—(CO)O—, —O(CO)—CH=CH—, —C≡C—, or a single bond, a is 0 or 1, MG is a mesogenic group, and R is H, CN, NO$_2$, halogen or a straight-chain or branched alkyl radical with up to 25 C atoms which may be unsubstituted, mono- or polysubstituted by halogen or CN, it being also possible for one or more non-adjacent CH$_2$ groups to be replaced, in each case independently from one another, by —O—, —S—, —NH—, —N(CH$_3$)—, —CO—, —(CO)O—, —O(CO)—, —O(CO)—O—, —S(CO)—, —(CO)S— or —C≡C— in such a manner that oxygen atoms are not linked directly to one another, or alternatively R denotes P-(SP-X)$_a$-.

3. The polymerizable liquid crystal material according to claim 1, wherein the polymerizable surface-active compound contains acryl, methacryl, epoxy, vinyl, vinyloxy, styrene or propenyl ether polymerizable groups.

4. The polymerizable liquid crystal material according to claim 1, containing 0.5 to 10% by weight of one or more photoinitiators containing an alpha-hydroxy acetophenone compound.

5. The polymerizable liquid crystal material according to claim 1, containing 0.01 to 10% by weight of one or more polymerizable surface-active compounds with four or more polymerizable groups.

6. The polymerizable liquid crystal material according to claim 1, containing at least one photoinitiator and 1 to 5% by weight of a thermal polymerization initiator.

7. The polymerizable liquid crystal material according to claim 6, wherein the polymerizable surface-active compound is a fluorocarbon surfactant.

8. The polymerizable liquid crystal material according to claim 1, wherein the polymerizable surface-active compound is at least one compound of the formula wherein Z$^3$, Z$^4$ independently are —(CO)O, —O(CO)—, —O(CO)O, —NH(CO)O, —O(CO)NH—, —O— or a single bond n is 3 to 12, m, o, p and q are independently, 0, 1, or 2

B is a group of —CP$_3$, —CRP$_2$, —NP$_2$ or

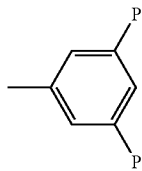

P is a polymerizable group attached by a spacer Sp,

Sp is a 1-12 C straight or branched alkylene, one or more non-adjacent CH$_2$ optionally being replaced, in each case independently from one another, by —O—, —NH—, —N(CH$_3$)—, —CO—, —(CO)O—, —O(CO)— or —C≡C— in such a manner that hetero atoms (O, N) are not linked directly to one another, and R is H, CN, NO$_2$, halogen or a straight-chain or branched alkyl radical with up to 25 C atoms which may be unsubstituted, mono- or polysubstituted by halogen or CN, one or more non-adjacent CH$_2$ groups optionally being replaced, in each case independently from one another, by —O—, —S—, —NH—, —N(CH$_3$)—, —CO—, —(CO)O—, —O(CO)—, —O(CO)—O—, —S(CO)—, —(CO)S— or —C≡C— in such a manner that oxygen atoms are not linked directly to one another.

9. The polymerizable liquid crystal material according to claim 1, comprising a) 50 to 96% by weight of up to five monoreactive mesogenic compounds having a polar terminal group, b) 0 to 30% by weight of up to four direactive polymerizable mesogenic compounds, c) 0.5 to 10% by weight of a polymerization initiator, d) 0.01 to 10% by weight of one or more polymerizable surface-active compounds.

10. A bilayered film comprising an anisotropic polymer film and a hard coat layer prepared from at least one polymerizable liquid crystal material according to claim 1.

11. An anisotropic polymer film having a surface and a core film, said anisotrophic polymer film being prepared from a polymerizable liquid crystal material according to claim 1, and having a surface more cross-linked than the core film.

12. A method for producing an anisotropic polymer film with a hard coat layer or with a surface more cross-linked than a core film, comprising applying a polymerizable liquid crystal material according to claim 1 onto a substrate and polymerizing the material, to produce such a film with a hard coat layer or with a surface more cross-linked than the core film.

13. In an optical device, a decorative device, a security device, a polariser, compensator, beam splitter, alignment layer, reflective film, color filter, holographic element, hot stamping foil, or colored image comprising a bilayered film, the improvement wherein the film is one according to claim 10.

14. In an optical device, a decorative device, a security device, a polariser, compensator, beam splitter, alignment layer, reflective film, color filter, holographic element, hot stamping foil, or colored image comprising an anisotropic polymer film, the improvement wherein the film is one according to claim 11.

* * * * *